(12) United States Patent
Kinsella et al.

(10) Patent No.: US 7,685,292 B1
(45) Date of Patent: Mar. 23, 2010

(54) TECHNIQUES FOR ESTABLISHMENT AND USE OF A POINT-TO-POINT TUNNEL BETWEEN SOURCE AND TARGET DEVICES

(75) Inventors: Joe Kinsella, Reading, MA (US);
Vikram Pillai, Westford, MA (US);
Andi Abes, Somerville, MA (US); Dave Rodger, Arlington, MA (US)

(73) Assignee: Dell Marketing USA L.P., Round Rock, TX (US)

( * ) Notice: Subject to any disclaimer, the term of this patent is extended or adjusted under 35 U.S.C. 154(b) by 688 days.

(21) Appl. No.: 11/399,593

(22) Filed: Apr. 6, 2006

Related U.S. Application Data

(60) Provisional application No. 60/669,032, filed on Apr. 7, 2005.

(51) Int. Cl.
*G06F 15/16* (2006.01)

(52) U.S. Cl. ..................... 709/227; 709/223

(58) Field of Classification Search .......... 709/220, 709/221, 222, 223, 224, 227
See application file for complete search history.

(56) References Cited

U.S. PATENT DOCUMENTS

| | | | |
|---|---|---|---|
| 5,805,803 A | | 9/1998 | Birrell et al. |
| 6,104,716 A | * | 8/2000 | Crichton et al. ............ 370/401 |
| 6,671,729 B1 | * | 12/2003 | Gordon et al. ............. 709/227 |
| 7,424,736 B2 | * | 9/2008 | Cook et al. ................ 726/11 |
| 2002/0065921 A1 | * | 5/2002 | Davidson et al. ........... 709/227 |
| 2003/0009571 A1 | * | 1/2003 | Bavadekar ................. 709/230 |
| 2004/0013130 A1 | * | 1/2004 | Blanchet et al. ........... 370/466 |
| 2004/0255164 A1 | | 12/2004 | Wesemann |
| 2005/0015624 A1 | | 1/2005 | Ginter et al. |
| 2005/0021772 A1 | | 1/2005 | Shedrinsky |
| 2005/0044350 A1 | | 2/2005 | White et al. |
| 2006/0031407 A1 | * | 2/2006 | Dispensa et al. ........... 709/219 |
| 2006/0168321 A1 | * | 7/2006 | Eisenberg et al. .......... 709/238 |

* cited by examiner

*Primary Examiner*—Ramy M Osman
*Assistant Examiner*—Marshall McLeod
(74) *Attorney, Agent, or Firm*—Muirhead and Saturnelli, LLC

(57) ABSTRACT

Described are techniques to establish an on-demand, secure, point-to-point tunnel between a source device of a source network to a target device of a target network. The target network may not be visible to the source network. The target network includes a tunnel client and a tunnel server may be a perimeter device of the source network. The tunnel client may send a first message to the tunnel server. Data may be transmitted from the source to target device by including the data in a return message in response to the first message. The first message and the return message may be sent over one or more "heartbeat" connections which are continually established and torn down to transmit data between the two networks, and the source and target devices therein.

20 Claims, 11 Drawing Sheets

TECHNIQUES FOR ESTABLISHMENT AND USE OF A POINT-TO-POINT TUNNEL BETWEEN SOURCE AND TARGET DEVICES

CROSS REFERENCE TO RELATED APPLICATIONS

This application claims priority to U.S. Provisional Patent Application No. 60/669,032 filed on Apr. 7, 2005, entitled "TECHNIQUES FOR ESTABLISHMENT AND USE OF A POINT-TO-POINT TUNNEL BETWEEN SOURCE AND TARGET DEVICES", which is incorporated by reference herein.

BACKGROUND

1. Technical Field

This application generally relates to computer connectivity, and more particularly to secure communication connections.

2. Description of Related Art

A user on a source device, such as a computer, may want to connect to a remote computer or other remote device. However, for any one or more different reasons including, for example, security reasons, the remote device may not be visible to the source device such that the user may not be able to establish a connection to the remote device to transmit messages. Existing solutions in order to establish a secure connection between two devices, such as the source device and the remote device, may include using a persistent secure tunnel, or an on-demand secure tunnel between either the two networks or two devices. However, both of the foregoing may require that at least the remote target device, or a device with visibility to the target device, be visible to the source device from which the user wishes to establish the connection. In some instances, it may not be possible, such as due to security policies, to have the target device be visible to the remote source device Thus, it may be desirable to have a technique for secure communications which does not require that at least one device of the target network be visible to the user. Additionally, it may be desirable that this technique provide this in an efficient manner while eliminating the need for specialized hardware and/or software used in providing the secure communications on either the source or target devices.

SUMMARY OF THE INVENTION

In accordance with one aspect of the invention is a method for establishing a secure connection between a source device and a target device comprising: providing a first connection between a tunnel client and a tunnel server, a second connection between said tunnel server and said source device, and a third connection between said tunnel client and said target device; receiving a request over said second connection at said tunnel server from the source device to send data to the target device; sending a first message from the tunnel client to the tunnel server over said first connection; sending said request in a return message over said first connection to said tunnel client; and sending said request to said target device from said tunnel client over said third connection. The source device may have visibility to the tunnel server, the tunnel client may visibility to the target device, and the tunnel client may have visibility to the tunnel server. The source device may not have visibility to the target device. The tunnel server may be included in a perimeter device of a source network which communicates with said source device. The method may also include: receiving, at said tunnel server over said second connection, a request from said source device to establish a tunnel; and transmitting said request over a fourth connection between said tunnel server and said tunnel client. The first connection may be continually re-established at a predetermined time interval. The first connection and a fourth connection may be used to transmit messages between said tunnel server and said tunnel client, said first connection being used to transmit messages and responses to initiate and terminate a tunnel between said source device and said target device, said fourth connection being used to transmit other messages. The fourth connection may be characterized as having a higher priority link that said first connection. The first connection and said fourth connection may be each continually re-established in accordance with different establishment time intervals. The first connection may have an expiration time interval indicating how long said first connection remains established. The first connection may remain established until occurrence of said expiration time interval elapsing, or said tunnel server receives a message to transmit over said first connection. Each of the first connection and the fourth connection may have different message queues. The tunnel server may service a plurality of tunnel clients. The tunnel client may connect to a plurality of tunnel servers. The tunnel server may be included on an interior device of a source network. At least one of said tunnel client and said tunnel server may permit access from a source network including said source device to a target network including said target device in accordance with access control privileges. The access control privileges of said tunnel client may indicate what devices in the target network are accessible to a particular user of said source network, and wherein said access control privileges of said tunnel server may specify privileges of users of the source network to access devices in the target network. The source device may be included in a source network and said target device may be included in a target network, said source network being a service provider network to perform monitoring of one or more objects in said target network, at least one of said objects being at a location of said tunnel client. The service provider network may establish communications with said target network by sending said request over said second connection.

In accordance with another aspect of the invention is a method for communicating between a source device and a target device comprising: receiving, at a tunnel server, a request from a source device to initiate a tunnel to said target device; transmitting said request from said tunnel server to a tunnel client over a first connection, said request being included in a return message to said tunnel client in response to another request from said tunnel client previously received at said tunnel server; and wherein said tunnel server receives incoming messages from said tunnel client and said tunnel server transmits an outgoing request from said source device to said target device by including said outgoing request in a return message to said tunnel client in response to one of said incoming messages, and wherein said tunnel client communicates said outgoing request to said target device over a second connection, and said source device and said tunnel server communication over a third connection.

In accordance with another aspect of the invention is a computer-readable medium including code thereon for establishing a secure connection between a source device and a target device, the computer-readable medium comprising code that: provides a first connection between a tunnel client and a tunnel server, a second connection between said tunnel server and said source device, and a third connection between said tunnel client and said target device; receives a request over said second connection at said tunnel server from the source device to send data to the target device; sends a first message from the tunnel client to the tunnel server over said first connection; sends said request in a return message over said first connection to said tunnel client; and sends said request to said target device from said tunnel client over said third connection.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
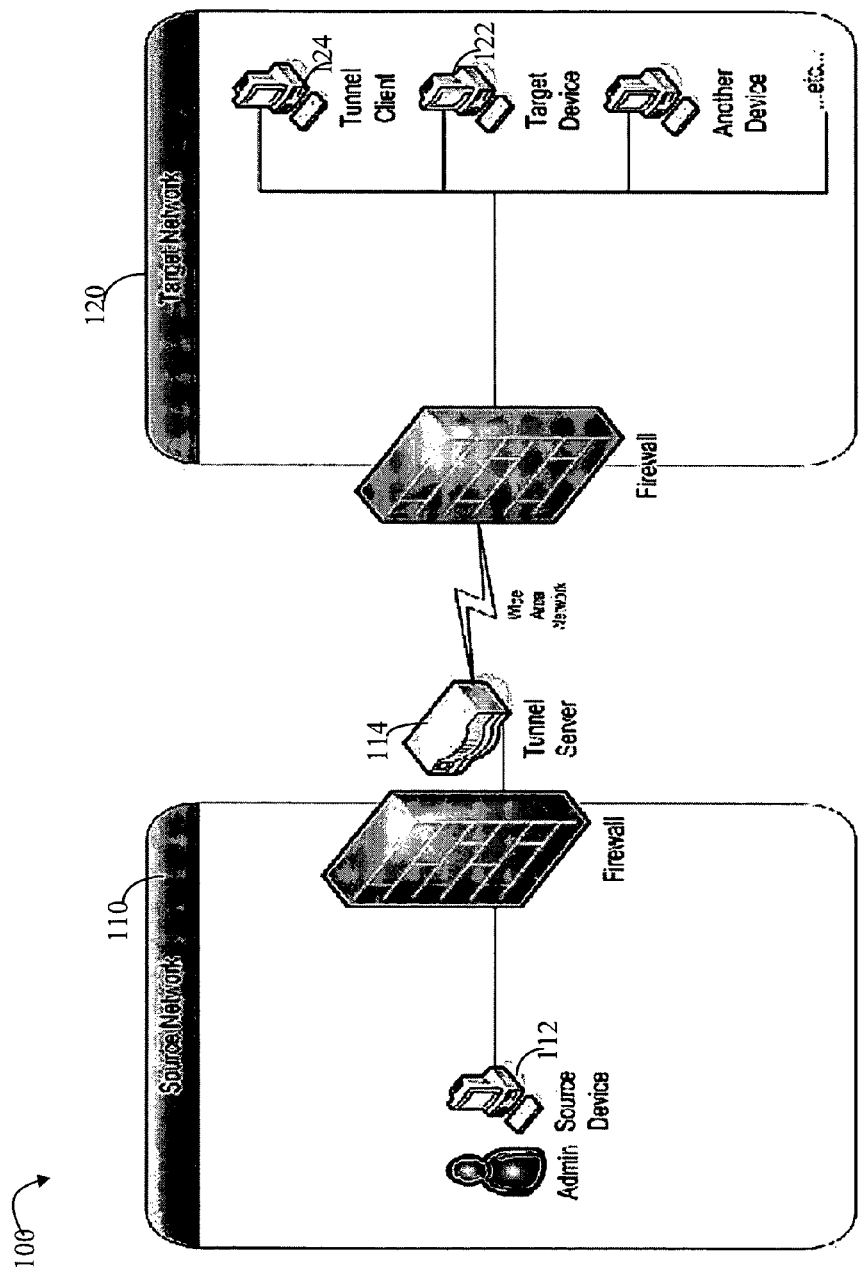
FIG. 1 is an example of an embodiment of a system that may utilize the techniques described herein.

Referring to FIG. 1, shown is an example of an embodiment of a system within which the techniques described herein may be performed. The example 100 includes two networks, the source network 110 and the target network 120. The source network 110 is the network from which the remote access may be initiated. The target network 120 is the network to which a connection may be made remotely from the source network. The example 100 also includes a source device 112, a tunnel server 114, a target device 122 and a tunnel client 124. The source device 112 is the device on the source network 110 from which the remote access may be initiated. The target device 122 is the device to which remote access may be obtained. Note that the source device 112 can be any device that has visiblity to the Tunnel Server. The target device 122 can be any device to which the Tunnel Client has visibility. Similarly, the Tunnel Client has visibility to the Tunnel Server. In one embodiment described herein, the foregoing visibility characteristics are present in an arrangement in which the location of the source device is within the source network, the Tunnel Server is included on a perimeter device, and the target device and Tunnel Client are included in the target network. However, the techniques described herein may be used with other arrangements of the components in accordance with the same visibility characteristics. For example, an embodiment may include one or more of the devices, Tunnel Server and/or Tunnel client in different arrangements than as described with reference to FIG. 1. The Tunnel Client may be included, for example, in a different network than the target device. As another example, the Tunnel Server, Tunnel Client, source device and target device may all be included within the same network. The foregoing are just some variations of the possible arrangements that may be used in connection with the techniques described herein.

As also described and used herein, visibility of a device may be characterized as denoting accessibility of one device to another such as, for example, through the existence of a route for network traffic to pass from one device to another. The Tunnel Server 114 and the Tunnel Client 124 are components that may be used in connection with establishing, maintaining, and utilizing a reverse point-to-point tunnel as part of a secure connection between the source and target networks. Both the Tunnel Server 114 and Tunnel Client 124 are described in more detail in following paragraphs.

In connection with FIG. 1 and using the techniques described herein, the target network is not required to be visible to the source network. In other words, there may not exist a route for network traffic to pass from a device on the source network 110 to a device on the target network 120. However, the Tunnel Server 114 on the source network 110 is visible to at least the device on which the Tunnel Client 124 is installed on the target network 120.

Figure 2:
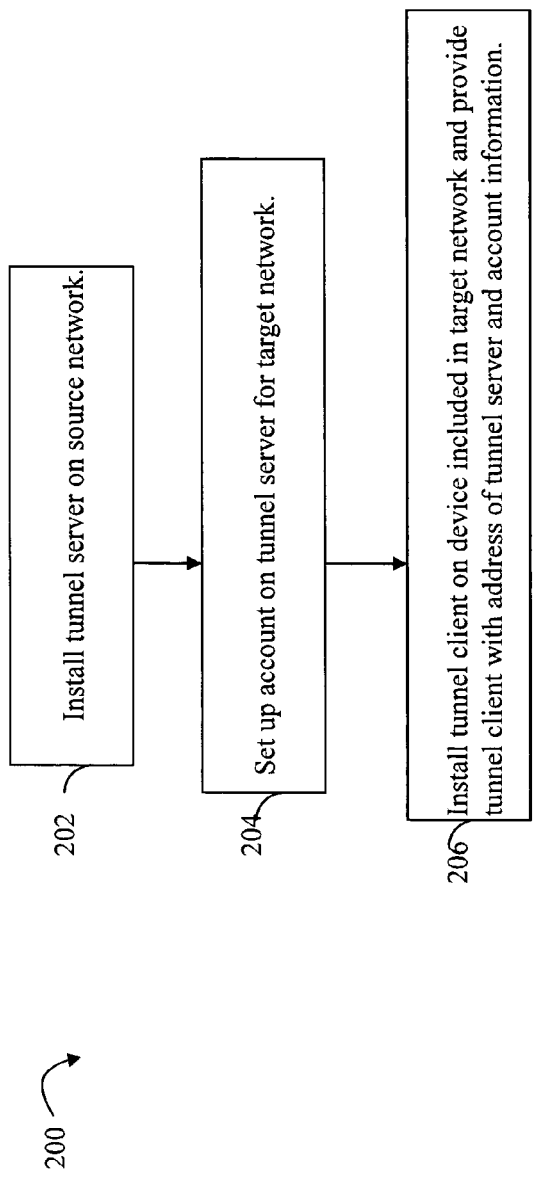
FIG. 2 is a flowchart of processing steps that may be performed in an embodiment of the system of FIG. 1 as part of setup processing to establish a reverse point-to-point tunnel between the source device and one or more target devices.

Referring now to FIG. 2, shown is a flowchart 200 of steps that may be performed in an embodiment of the system of FIG. 1 as part of setup processing in order to establish a reverse point-to-point tunnel between the source device and one or more target devices. At step 202, the Tunnel Server is installed on the source network such that the Tunnel Server is visible, for example, across the WAN link (e.g. Internet) from the target network as illustrated in FIG. 1. Although FIG. 1 illustrates use of a WAN link, the connection may be any one or more types of communication links known to those of ordinary skill in the art such as for, example, a modem connection, a T3 pipe, and the like. At step 204, an account is setup on the Tunnel Server for the specific target network 120. The account may include, for example, any form of a two-factor authentication (e.g., an identifier and a password). Other authentication information and techniques known in the art may also be used. At step 206, the Tunnel Client is installed on a device on the target network that has visibility to one or more devices to which the source network wants remote access. With reference to FIG. 1, the Tunnel Client is installed on the device 124 of the target network 120. As part of the installation processing of step 206, the Tunnel Client may be provided with the location of the Tunnel Server (e.g. an IP address of the Tunnel Server), and the authentication information provided with the account setup for this target network from step 204.

Once setup processing is complete as indicated by completion of the processing of flowchart 200, a tunnel can be requested on demand from the source network to any visible device on the target network.

Figure 3:
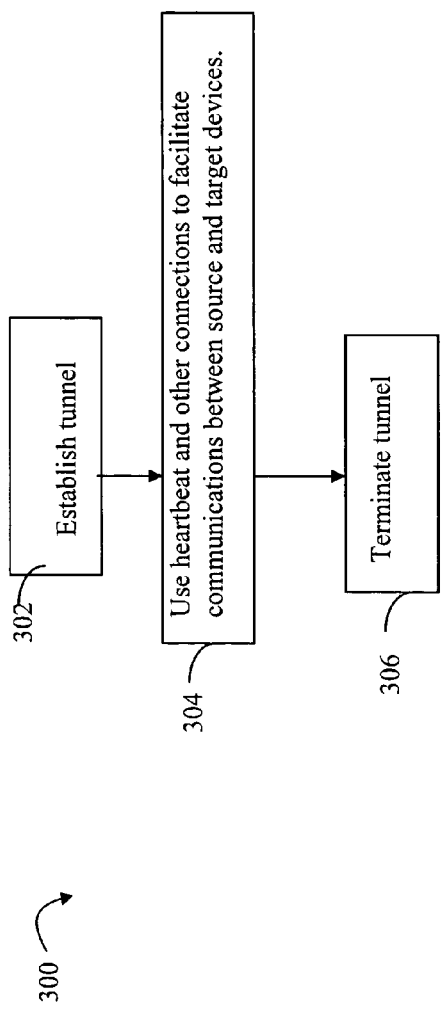
FIG. 3 is a flowchart of processing steps that may be performed in an embodiment connection with the source and target networks of FIG. 1.

Referring now to FIG. 3, shown is a flowchart 300 of processing steps that may be performed in connection with the source and target networks to establish a tunnel on demand using the techniques described herein. At step 302, a request is made to establish a tunnel to a specific device in the target network. This request may be made, for example, by a user of the source device or an application program residing and executing on the source device. This request for a tunnel is received by the Tunnel Server and communicated, at step 304, to the Tunnel Client using a "heartbeat" connection and other connections as described in more detail in following paragraphs. Processing of step 304 may include one or more sets of messages exchanged between the Tunnel Server and Tunnel Client. After a time period when communications between the source and target devices are no longer desired, a request may be made to terminate the tunnel. Such a termination request may be made, for example, from the user or application on the source device 112 of the source network 112.

What will now be described in more detail is the "heartbeat" connection which facilitates communications between the source and target networks using data request or messages initiated by the Tunnel Client of the target network.

The "heartbeat" connection may be characterized a recurring connection that is continually established and torn down after a message exchange during the lifetime of the Tunnel Client. It can be characterized as a "heartbeat" connection, because even if there is no data to be transferred, the connection is closed at a predefined expiration interval. This establishes liveliness of the connection to within that expiration interval.

After performing the steps of flowchart 200 of FIG. 2, the Tunnel Client may initiate an outbound connection to the Tunnel Server. This connection, referred to herein as the "heartbeat" connection, may be characterized as an intermittent connection that is continually established and torn down for the lifetime of the Tunnel Client. Using the heartbeat connection, the Tunnel Client 124 may continually send a message at predetermined time intervals to the Tunnel Server 114. For each sent message, a return message is transmitted from the Tunnel Server 114 to the Tunnel Client 124. It is through the use of this heartbeat connection that data is transmitted between the source network 110 and the target network 120.

Operations that may be performed over the heartbeat connection each time there is a connection made from the Tunnel Client to the Tunnel Server will now be described. The Tunnel Client may send a message to the Tunnel Server providing the authorization information, such as the two-factor authentication information as described elsewhere herein, to allow for authentication of the Tunnel Client to the Tunnel Server. In addition to the authentication information, the Tunnel Client may also transmit any results to the Tunnel Server to previous requests, or otherwise resulting from previous requests. This data may be received at the Tunnel Server for further processing and/or dispatching by the Tunnel Server on the source network as described in more detail in following paragraphs.

The Tunnel Server may include an outgoing queue of requests, such as requests from the source device 112, or other data to be transmitted to the Tunnel Client. Any pending requests in the Tunnel Server's outgoing queue may be retrieved and transmitted back to the Tunnel Client. If there are multiple requests in the outgoing queue, these requests may be packaged in a single message sent to the Tunnel Client. It should be noted that since the Tunnel Client may not be visible to the Tunnel Server in an embodiment as described herein, the Tunnel Server may rely on the Tunnel Client to "pull" the requests instead of the Tunnel Server "pushing" the requests.

Traffic flowing over the heartbeat connection may be encrypted for security and compressed to reduce bandwidth utilization. The heartbeat connection may not necessarily be a persistent connection and can be established and torn down as needed.

Figure 4:
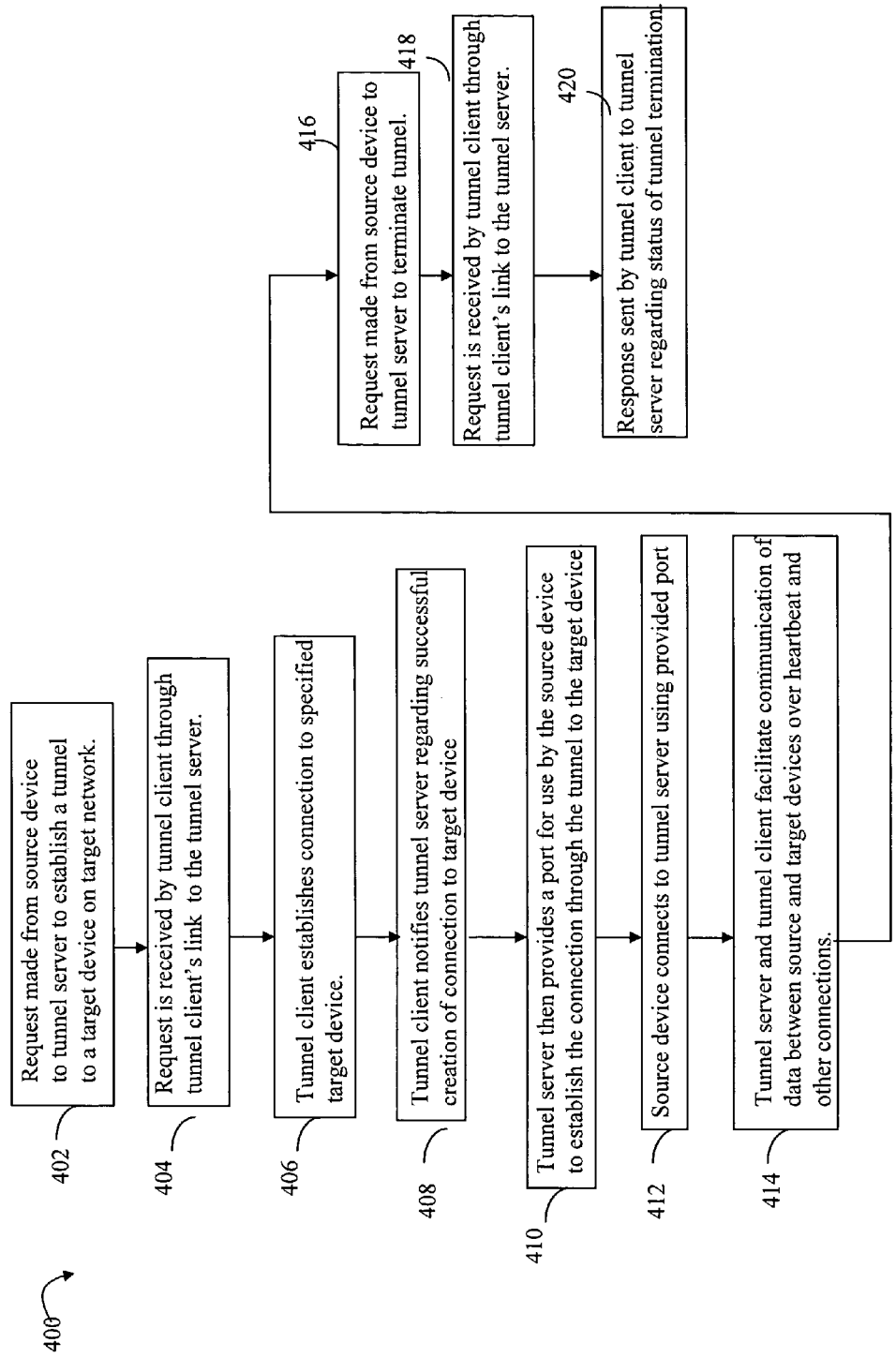
FIG. 4 is a flowchart of more detailed processing steps of FIG. 3 that may be performed in connection with the reverse point-to-point tunneling technique described herein.

Referring now to FIG. 4, shown is a flowchart of more detailed processing steps that may be performed in connection with the reverse point-to-point tunneling technique described herein. The steps of flowchart 400 set forth in more detail the processing steps of flowchart 300. At step 402, a request is made from the source device to establish a tunnel. As described elsewhere herein, the request may be, for example, from a source device to establish a tunnel to a specific device on the target network for a specific protocol (e.g. connect to device A using telnet). At step 404, the request is received by the Tunnel Client though the Tunnel Client's link to the Tunnel Server. This request may be placed in the outgoing queue of the Tunnel Server and is transmitted to the Tunnel Client in the next return message through the heartbeat connection. At step 406, the Tunnel Client receives the message and establishes a connection to the specified target device. At step 408, the Tunnel Client notifies the Tunnel Server via a return response message regarding successful creation of the connection to the target device. At step 410, the Tunnel Server then provides an end-point (e.g., TCP port) for use by the source device to establish a connection through the tunnel to the target device. At step 412, the source device connects to the tunnel server using the provided end-point. At step 414, the tunnel server and tunnel client facilitate communication of data between the source and target devices using the heartbeat and other connections. It should be noted that step 414 may include one or more messages and associated responses between the two networks until a request is made to terminate the existing tunnel. At step 416, a request is made from the source device to tunnel server to terminate the tunnel. At step 418, the terminate tunnel request is received by the Tunnel Client through the Tunnel Client's link to the Tunnel Server, such as using the heartbeat connection and other connections. At step 420, a response message is sent from the Tunnel Client to the Tunnel Server reporting on the status of the tunnel termination operation.

It should be noted that an embodiment may also provide for termination of the tunnel in other ways. For example, at any point during the communication, it is possible for an application on the target device to terminate the connection to the Tunnel Client. If this occurs, step 420 may be executed directly after step 414.

Figure 5:
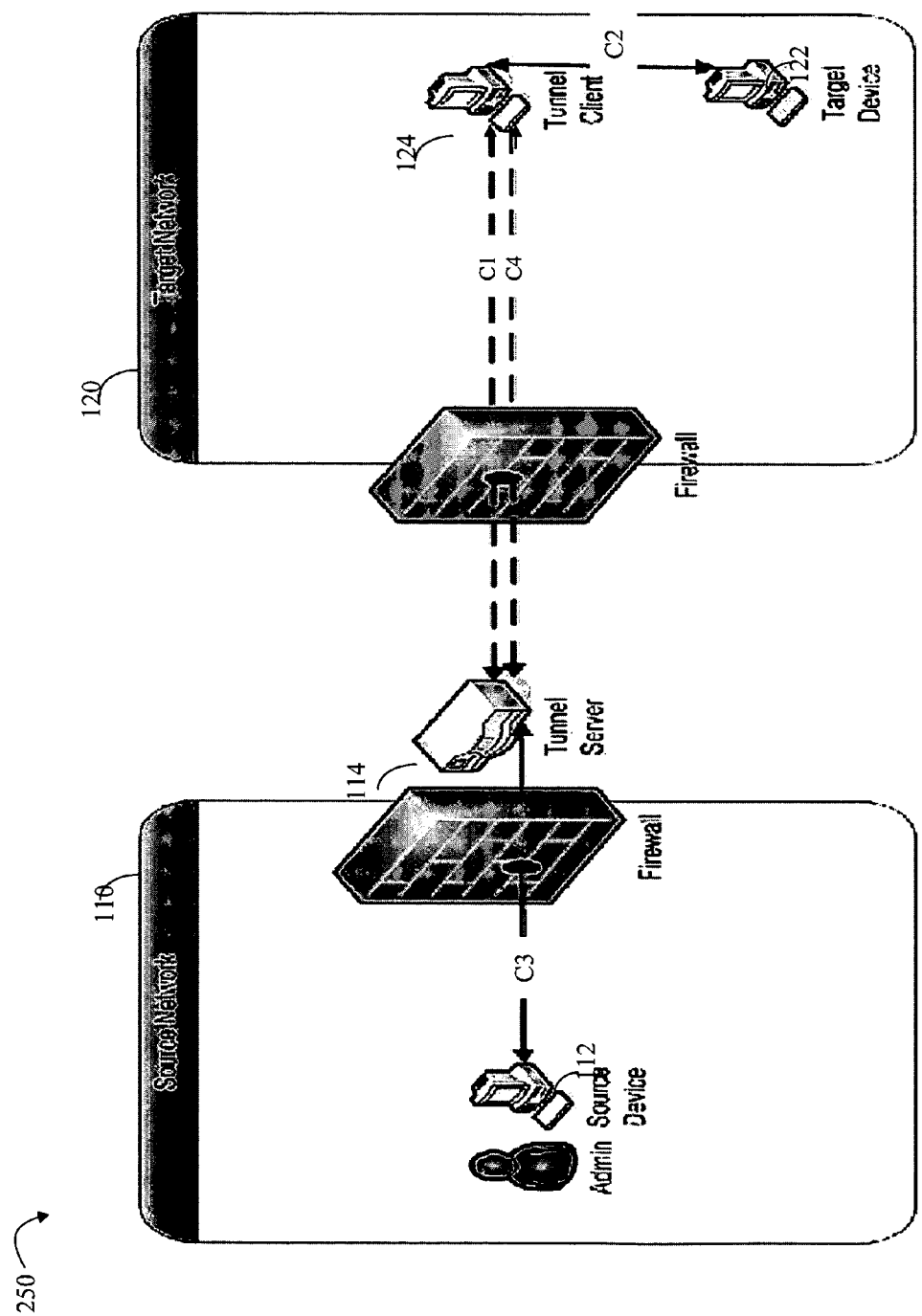
FIG. 5 is an illustration of the flow of data that may be performed in an embodiment in connection with a reverse point-to-point tunnel using the techniques described herein.

Referring now to FIG. 5, shown is an illustration 250 of the flow of data that may be performed in an embodiment in connection with a reverse point-to-point tunnel. Included in this example are four connections, C1-C4, over which various messages, or requests, may be transmitted between the source and target networks. The particular messages that may be exchanged in an embodiment are described in more detail elsewhere herein. What will now be described is the general flow of data over these connections with reference to the previously described processing steps of FIG. 4.

Connection C1 corresponds to the heartbeat connection used for bidirectional communications between the Tunnel Client and Tunnel Server in which a first heartbeat message is sent from the Tunnel Client to the Tunnel Server. The return second heartbeat message is sent from the Tunnel Server to the Tunnel Client. In this second heartbeat message, the request to establish a tunnel, as well as other message types, may be transmitted. In one embodiment, one or more connections or links may correspond to the heartbeat connection as described herein to facilitate communications between the source and target networks. In one embodiment as illustrated in FIG. 5, two connections, C1 and C4, may be used as the heartbeat connections. The use of connection C4 may allow for the reduction in latency in the data transmissions between the source and target devices, and may be used for the transfer of data between these two devices. Connection C1, as well as C4 described below, have been illustrated in FIG. 5 with dotted lines to denote that these connections are not necessarily a persistent connections and can be established and terminated as needed. Connection C4 may be characterized as a higher priority link than connection C1 that may be included in an embodiment. Connection C4 may be used to transmit particular types of messages between the Tunnel Client and Tunnel Server. Connection C1 may be used to transmit the remaining types of messages that may occur between the Tunnel Server and Tunnel Client not transmitted over connection C4. In one embodiment, connection C4 may use additional resources beyond those used for connection C1. Connection C1 may be used for transmitting the messages and responses to initiate and terminate a tunnel. Connection C4 may be used for transmitting remaining message types including data sent to/from the source and target devices. Connection C4 may parallel functionality of connection C1 with the addition of a reduced interval (e.g., the establishment interval as described elsewhere herein) between the establishment and teardown of connections. Both C1 and C4 may use compression. Thus, once a tunnel has been established using connection C1, connection C4 may be used to transmit data between source and target devices until a terminate tunnel message is sent by the source device. The use of the additional connection C4 allows for data to be transmitted between Tunnel Server and Tunnel Client efficiently while also minimizing traffic using compression. The foregoing use of both the C1 and C4 connections may be preferred, for example, if a tunnel is used in transferring data in accordance with both lightweight and heavyweight protocols (e.g., telnet vs. a graphical remote access protocol such as RDP) over both low and high throughput links (e.g., 56K modem vs. a T3 connection).

Connection C2 denotes the bidirectional connection between the Tunnel Client and the Target Device. Connection C3 denotes the bidirectional connection between the source device and the Tunnel Server.

In one embodiment using two heartbeat connections C1 and C4, the Tunnel Server may include two outgoing queues. A first queue may be used to queue outgoing messages over connection C1. A second queue may be used to queue outgoing messages over connection C4. When an incoming message is sent from the source device to the Tunnel Server, for example, the Tunnel Server may classify the message type and accordingly place the message in the appropriate outgoing queue. If the message is a request for establishing or terminating a tunnel, the Tunnel Server may place the message in the outgoing queue for connection C1 if the connection C1 is not yet established. Similarly, if the message received at the Tunnel Server is of a different type other than for establishing or terminating a tunnel, the Tunnel Server uses connection C4 and C4's associated outgoing queue as appropriate. It should be noted that other embodiments may use different outgoing message queue configurations than as described herein. For example, a single prioritized message queue may be used including outgoing requests for both C1 and C4. The messages in the single queue may be prioritized in accordance with any one or more criteria such as message type, age of message, and the like. Similarly, the Tunnel Client may also include two outgoing queues, one for the responses to requests made by the Tunnel Server over C1, and another for the requests and response for delivery over C4.

The Tunnel Client's outgoing queue for C4 can be used to optimize the performance of the connections. For example, connection C4 can be established based on its establishment interval or timeout, or in response to items being included in the outgoing transmission queue. This ensures timely delivery of requests to the Tunnel Server. Although the foregoing describes a queue, any other data structure can be used for the interim caching of requests and responses.

Connections C1 and C4 may be established and torn down at predetermined time intervals (the establishment timeout or interval). In one embodiment, a first time interval is used for C1 which may be different than the time interval used for C4. The particular time intervals selected may vary in accordance with the message traffic and other particulars in an embodiment. The connection C1 may be established by the Tunnel Client to the Tunnel Server each first time interval. Connection C1 may remain established for a time period, such as 30 seconds, or until the Tunnel Server receives an outgoing request, whichever occurs first. This time period, indicating the amount of time a connection remains once established, may be referred to as an expiration timeout and can be used to minimize the resource utilization on the Tunnel Client or Tunnel Server by reducing the number of overall times in which a connection may be established and re-established. Upon the occurrence of either the time period expiring or receipt of an outgoing request for C1, the Tunnel Server transmits a response heartbeat message over C1 to the Tunnel Client. If there is a pending message to be sent to the Tunnel Client, the response message includes the outgoing message data. The connection C4 may be established by the Tunnel Client in a similar manner using the same expiration timeout, but a different establishment timeout. In one embodiment, the establishment interval for C4 may be smaller than the establishment interval associated with C1. In addition to the connection C4 being established in accordance with the establishment interval, connection C4 may also be established by the Tunnel Client in an event-driven manner when there is data to be sent to the Tunnel Server as soon as items are added into its queues. Once a connection C4 is established, it may remain until expiration of the specified expiration timeout, or until an outgoing message is received by the Tunnel Server for transmission to the Tunnel Client. Upon the occurrence of either the expiration time period expiring or receipt of an outgoing request over connection C4, the Tunnel Server transmits a response heartbeat message over C4 to the Tunnel Client. If there is a pending message to be sent to the Tunnel Client, the response message includes the outgoing message data. In connection with each of the foregoing C1 and C4 links, the associated connections may remain for a specified expiration timeout that may vary with each connection. The expiration timeout is the amount of time that the link or connection remains established to wait for the possible arrival of outgoing requests from the Tunnel Server.

Figure 5A:
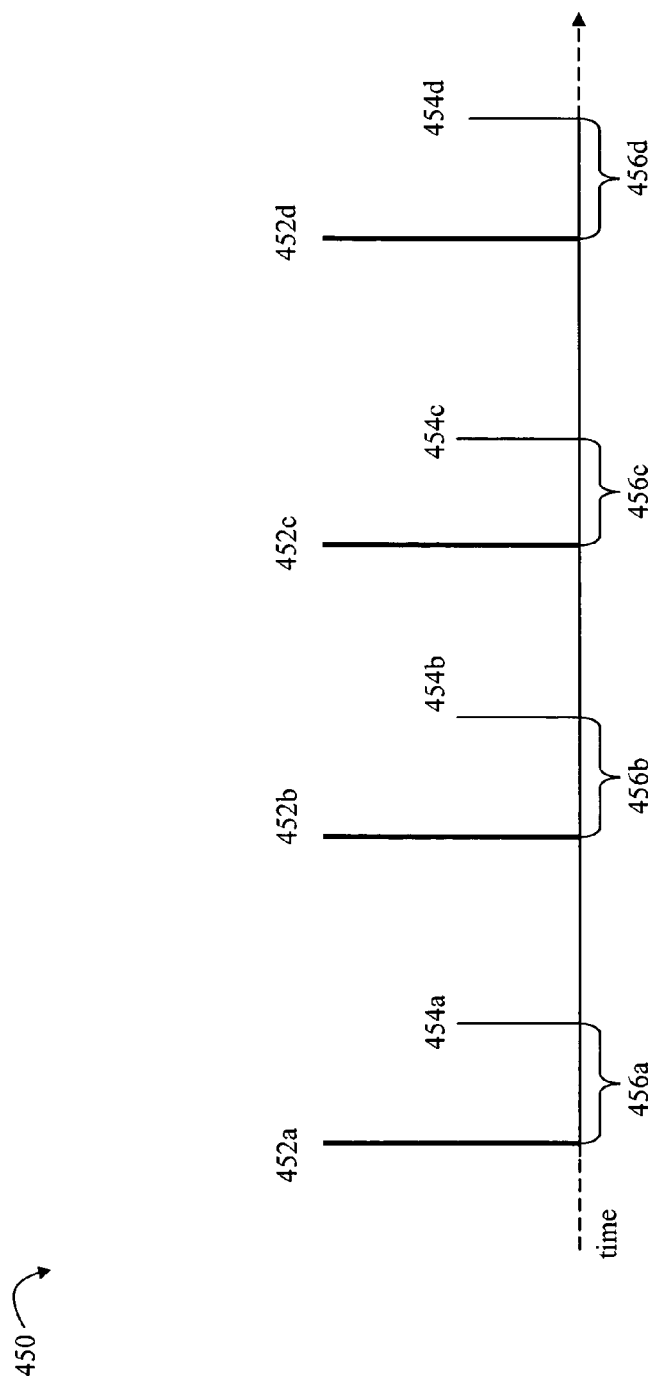
FIG. 5A is an example illustrating use of establishment time intervals and expiration time intervals.

Referring now to FIG. 5A, shown is an example representation illustrating use of the establishment time intervals and expiration time intervals or timeouts as described herein. In the example 450, each of 452a, 452b, 452c, and 452d may represent an establishment time interval elapsing at a point in time. Each of 456a, 456b, 456c, and 456d may represent an absolute amount of time equal to the expiration time interval. Each expiration time interval (456a, 456b, 456c, and 456d) may be measured with respect to an occurrence of an establishment time interval. Each of 454a, 454b, 454c and 454d may represent the resultant time after an expiration time interval has elapsed with respect to an establishment time interval occurrence. As described herein, for example, a connection, such as C1, may be established at each establishment time interval (e.g., 452a, 452b, 452c, and 452d). At each establishment time interval, the connection C1 may remain established for a time period indicated by the expiration time interval or timeout (e.g., 456a, 456b, 456c, and 456d), or until the Tunnel Server receives an outgoing request, whichever occurs first. In other words, in one embodiment, the connection C1 at each establishment time interval will remain established no longer than the expiration time interval.

It should be noted that an embodiment may include one or more Tunnel Servers in communication with one or more Tunnel Clients. In other words, a Tunnel Server can serve one or more Tunnel Clients and a Tunnel Client can connect to one or more Tunnel Servers. A single Tunnel Server can allow connections from one or more Tunnel Clients residing on the same or different target networks. In addition, a single Tunnel Client can support multiple tunnels to the same or different device. In the event of more than one tunnel being established between source/target devices, the Tunnel Client utilizes the same connections C1 and C4, thereby minimizing resource utilization on the Tunnel Client and Tunnel Server.

A Tunnel Client can also be configured to connect to multiple Tunnel Servers, for supporting either remote access from multiple source locations, redundancy or failover. The Tunnel Servers that a single Tunnel Client connect to can be on the same or different source networks.

Figure 6:
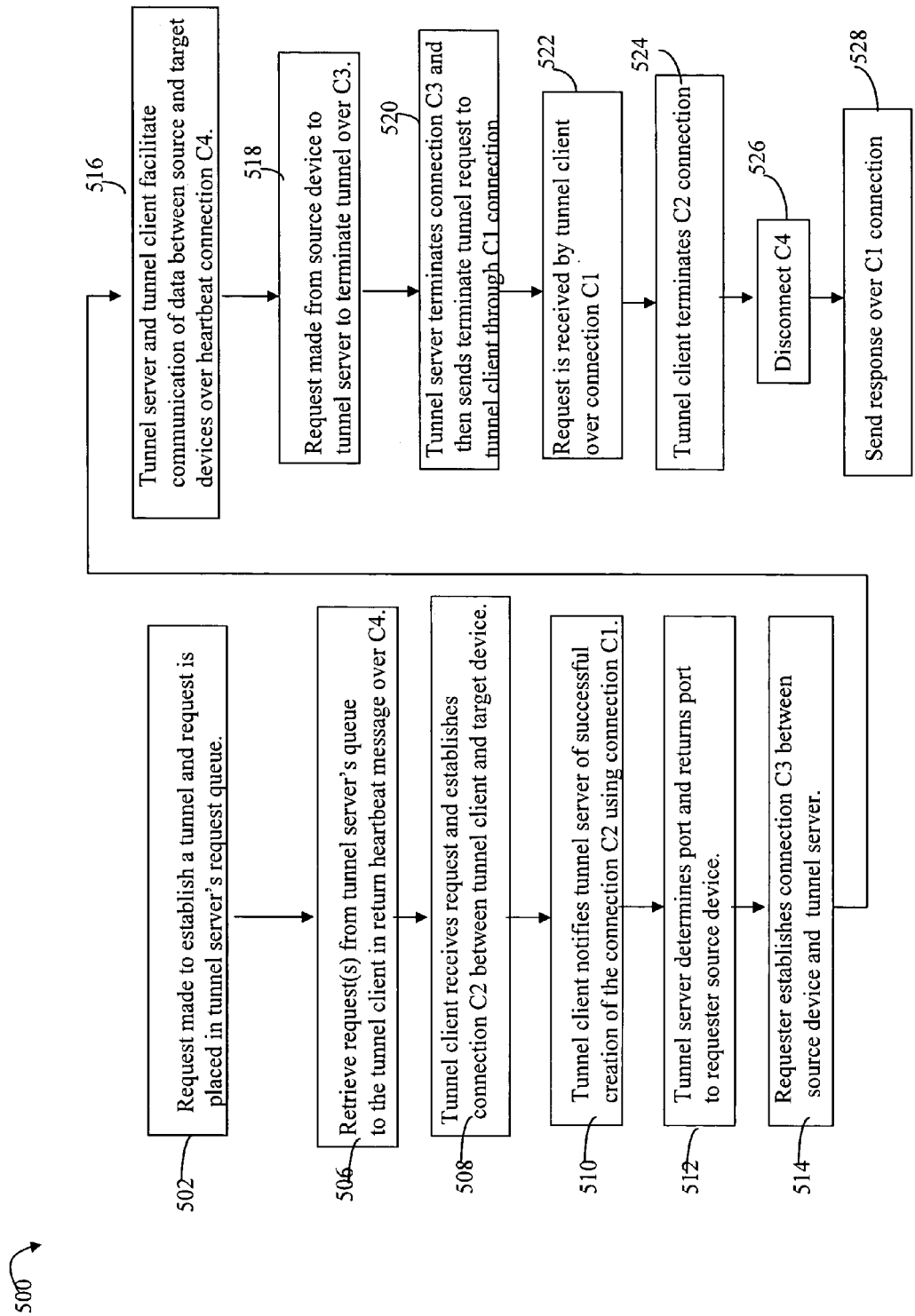
FIG. 6 is a flowchart of the processing steps of FIG. 4 with additional detail in connection with the use of connections C1-C4 illustrated in FIG. 5.

What will now be described with reference to flowchart 500 of FIG. 6 are processing steps of FIG. 4 with additional detail in connection with the use of connections C1-C4 as illustrated in FIG. 5. At step 502, a request is made from the source device to establish a tunnel and is placed in the Tunnel Server's outgoing request queue. The establish tunnel request is retrieved at step 506 from the outgoing request queue the next time a C1 "heartbeat" connection is established. The request may be transmitted as a return heartbeat message in which data is pulled from the tunnel server by the tunnel client. At step 508, the Tunnel Client handles the request by establishing a connection C2 between the Tunnel Client and the specified device, using the specified protocol. At step 510, the Tunnel Client then notifies the Tunnel Server of the successful creation of the connection C2 to the target device using connection C1. At step 512, the Tunnel Server then provisions an available end-point for use by the source device to establish the connection thru the tunnel to the target device (e.g. TCP port 24001). This end-point represents a virtual connection to the target device. The end-point, such as a port, is communicated back to the person or software that made the request at step 502 to establish the tunnel. At step 514, the person or software on the source device then uses any third-party technology capable of communicating using the specified protocol (e.g. telnet) to establish connection C3 between the source device and the Tunnel Server. At step 516, the Tunnel Server and Tunnel Client communicate using heartbeat connection C4 until a request is made, at step 518, to terminate the tunnel. The request to terminate the tunnel is made at step 518 over connection C3 and is received by the Tunnel Server. The Tunnel Server then transmits the request to terminate the tunnel over connection C1. At step 520, the Tunnel Server terminates connection C3 and then sends a terminate tunnel request to the Tunnel Client through C1 connection. At step 522, the request to terminate the tunnel is received by the Tunnel Client. At step 524, the Tunnel Client terminates the C2 connection and then disconnects the C4 connection at step 526. At step 528, the Tunnel Client sends a response over connection C1 to the Tunnel Server. At any point after the tunnel is set up for communication in step 516, the application on the target device can terminate the connection C2 based on the protocol state. If C2 is terminated due to this or any other connectivity issue, step 524 directly executes after step 516, skipping all intervening steps.

In connection with the foregoing, at step 518, the request to terminate the tunnel may be made by a user or software of the source device by issuing a terminate tunnel request. A termination request may be made by also closing an application making use of the tunnel. If the application has been terminated, a network level disconnect may be received by the Tunnel Server via the C3 connection. If the tunnel disconnect has been requested directly, a disconnect request is received by the Tunnel Server external to the standard connections. In connection with the response sent at step 528, if the disconnect request was made directly to the Tunnel Server via an external channel, the successful termination status is returned to the caller.

In one embodiment, a status or response message may be returned in connection with one or more operations as described herein even though not explicitly described herein. For example, after the Tunnel Client terminates the C2 connection at step 524, a status message indicating success or failure may be returned to the Tunnel Server. Each of the status messages may be returned using the particular heartbeat connection (e.g., C1 or higher priority link C4) in accordance with the particular request message type.

It should be noted that all traffic flowing over connections C1 and C4 may be encrypted for security. Additionally, connection C4 may perform transmissions using data compression to reduce bandwidth utilization.

Once a tunnel has been established as described herein, processing may be performed in connection with transmission of data to/from the source device and the Tunnel Server, and between the Tunnel Client and the target device. In connection with transmission of data, an embodiment may utilize one or more criteria in connection with the techniques described herein. One embodiment may utilize as criteria minimization of the following four factors:

1. resource utilization of the Tunnel Server
2. resource utilization of the Tunnel Client
3. bandwidth utilization over the WAN link
4. the network latency between source and target devices In connection with the foregoing four elements above, an embodiment may use the C4 higher priority link in addition to the C1 link as described herein as the two "heartbeat" connections, each connection used for transmission of different message types as described elsewhere herein. The introduction of C4 allows for efficient data transmissions, seeks to minimize the amount of traffic through compression, and allows both the Tunnel Client and Tunnel Server to only utilize the additional resources needed to support the tunnel once a tunnel has been established. Similarly, the reduced establishment timeout for C4 also serves to reduce latency, and the existence of an expiration timeout serves to reduce resource utilization on both the Tunnel Server and Tunnel Client.

Minimization of the foregoing factors in an embodiment may be desirable, for example, since the tunnel can be used in an embodiment to transfer both light and heavyweight protocols (e.g. telnet vs. a graphical remote access protocol such as RDP) over both low and high-throughput links (e.g. 56K modem vs. T3).

What will now be described are more detailed processing steps in connection with managing the data flow between the source and target device.

Data Received By Tunnel Client From Target Device (C2)

1. When the Tunnel Client receives data from the target device, the Tunnel Client establishes connection C4 to deliver the data to the Tunnel Server if C4 is not already established.
2. The Tunnel Server receives the incoming data and may place the request in an incoming message queue for C4, a high priority queue, for rapid deliver to the source device. It should be noted that an embodiment may include one or more incoming queues for messages received over each of the C1 and C4 connections. In one embodiment as described herein including both the C1 and C4 connections, the Tunnel Server may have two incoming queues and the Tunnel Client may similarly have two incoming queues. Data received may be initially placed in the respective queue for subsequent dispatch. On the Tunnel Server, the data may be dispatched from an incoming queue to the source device. On the Tunnel Client, the data may be dispatched from an incoming queue to the target device. For incoming data over C4, the queue may be referred to as a high priority queue and any operations on the data from the C4 queue may be characterized as being processed with a higher priority than other incoming data received, for example, over connection C1 and its associated queue.
3. The Tunnel Server allocates a high priority resource to process the incoming request, which delivers the data to the source device over connection C3.
4. The third-party software running on the source device then receives and handles the incoming data.

Data Received By Tunnel Server From Source Device (C3)

1. When the Tunnel Server receives data from the source device, the Tunnel Server places the request to deliver data in a high priority queue.
2. Upon the Tunnel Client establishing connection C4 to the Tunnel Server, the request in the high priority queue is then delivered to the Tunnel Client as a return "heartbeat" message.
3. The Tunnel Client then places the request in a high priority queue for delivery to the target device.
4. The Tunnel Client allocates a high priority resource to process the incoming request, which delivers the data to the target device over connection C2.
5. The third-party software running on the target device then receives and handles the incoming data.

The messages described herein may be of different types of requests. In accordance with the particular type of request, connection C1 or C4 may be used to transmit the request between the Tunnel Server and Tunnel Client. Additionally, the other connections C2 and C3 are also used as described herein in connection with forwarding data between the source and target devices.

It should be noted that an embodiment may also include a fifth type of request originating from the target device to terminate the tunnel. In connection with this fifth message type, the message is sent from the target device to the source device. When a fifth type of request is generated, with reference to the connections illustrated in FIG. 5, the C2 connection is terminated. A message including the fifth type of request to terminate the tunnel may be sent over connection C4 from the Tunnel Client to the Tunnel Server with the remaining data received from the target device. The Tunnel Server may then terminate the C3 connection.

Figure 7:
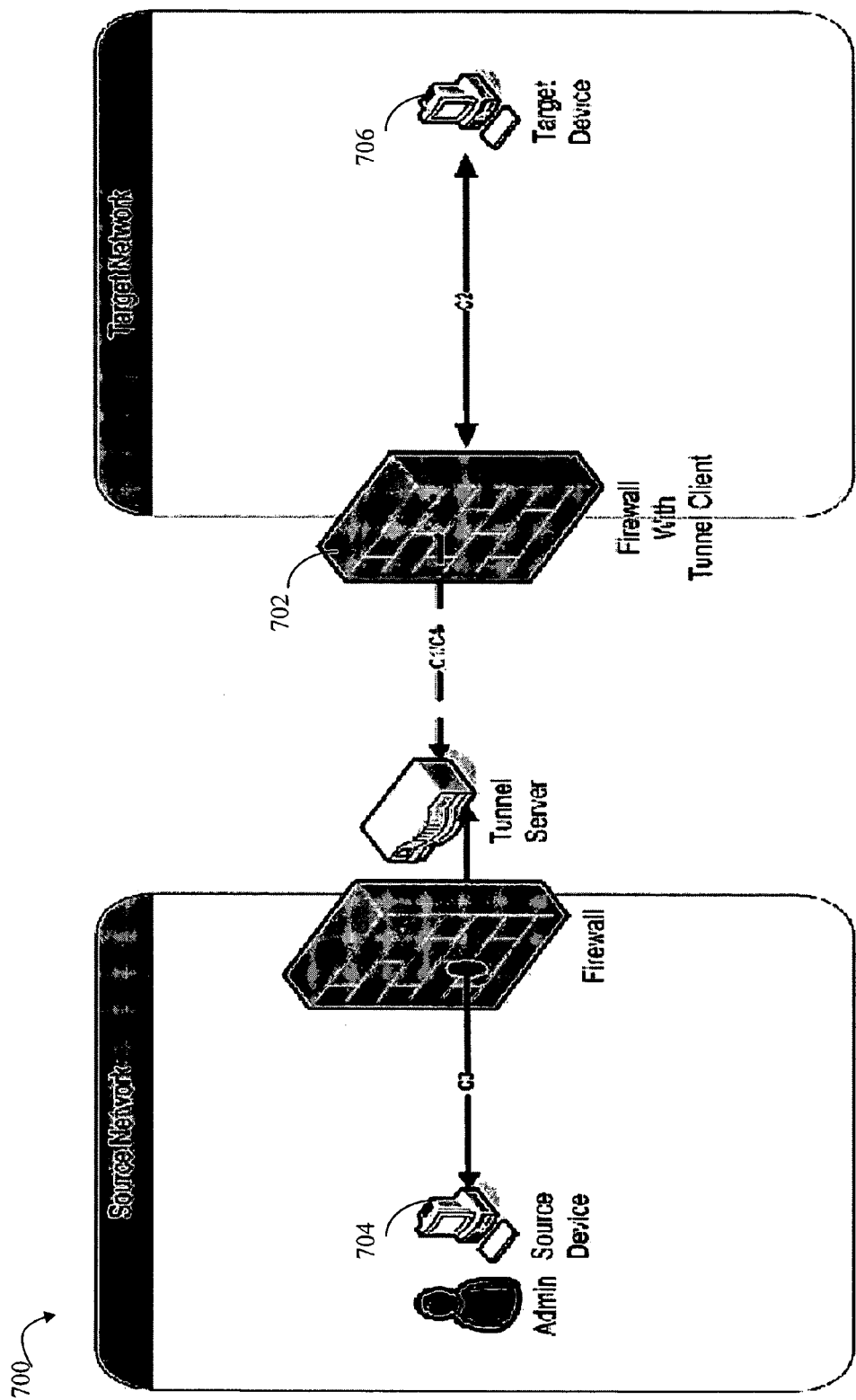
FIGS. 7 and 8 are further examples of embodiments of different configurations that may be used in connection with the techniques herein.
Figure 8:
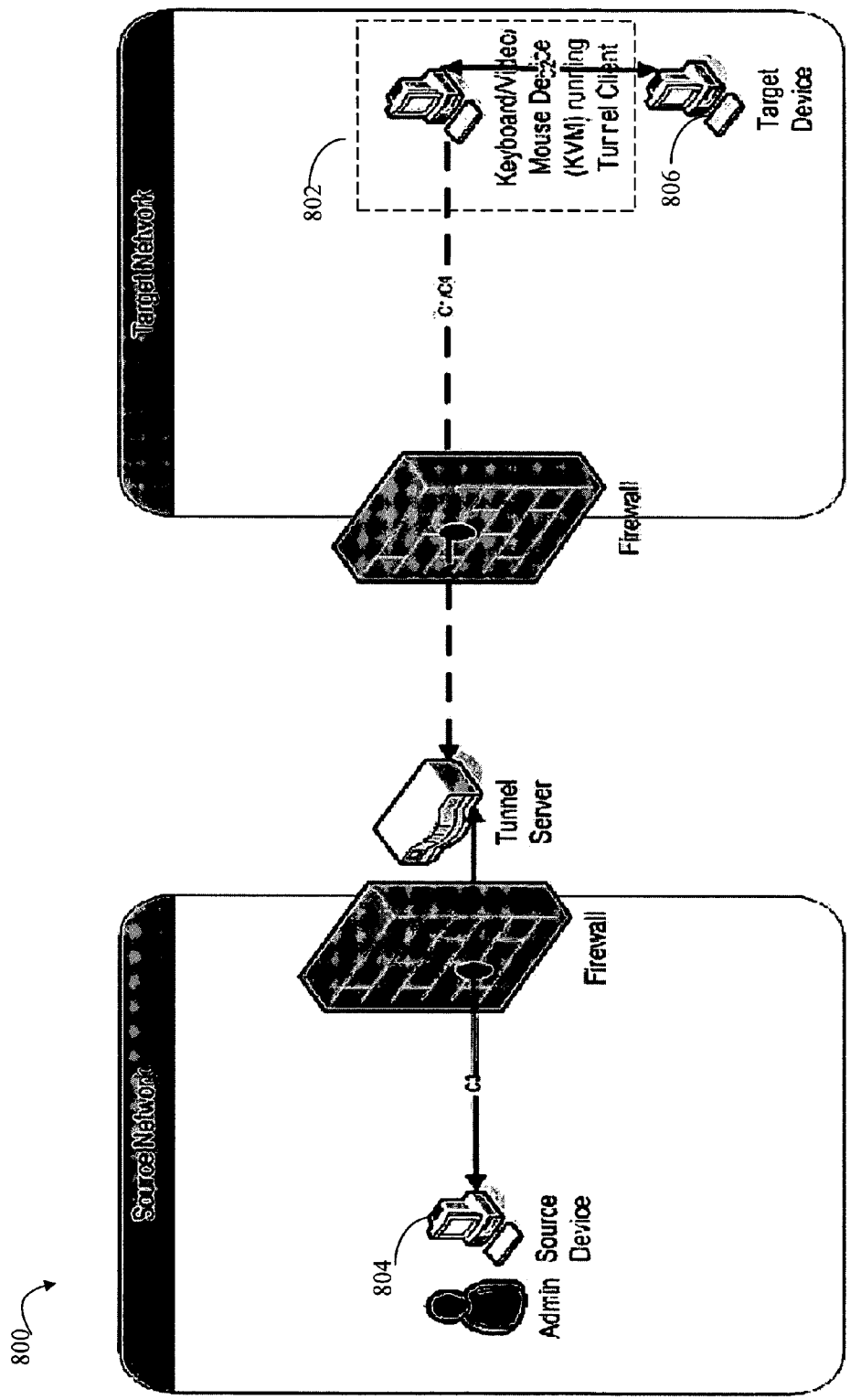

What will now be illustrated in connection with FIGS. 7 and 8 are further examples of embodiments of different configurations that may be used in connection with the techniques herein.

Referring now to FIG. 7, shown is another example of an embodiment that may utilize the techniques described herein. In the example 700, the techniques described herein may be used in connection with providing on-demand services such as, for example, remote access, monitioring, configuration management, or the delivery of a service such as through an embedded device such as a firewall device 704. In the example 700, the Tunnel Client may reside on the perimeter firewall device 702 of the target network. The tunnel client in this embodiment of FIG. 9 may be implemented using, for example, software and/or firmware on the perimeter firewall device 702. By using the techniques described herein, a user on a source device 704 may remotely access a target device 706 visible only to the interior link of the firewall (e.g., the source device does not have visibility to the target device).

Referring now to FIG. 8, shown is yet another example of an embodiment that may be used in connection with the techniques described herein. As described elsewhere herein, an embodiment may use the techniques described herein in connection with providing on-demand services such as, for example, for remote access, monitoring, configuration management, or the delivery of a service through an embedded device such as a keyboard-video-mouse device (KVM) 802. The example 800 shows the Tunnel Client residing on a network-enabled KVM device 802 that is connected to one or more target systems that may be include in the same, or different networks. The Tunnel Client included in 802 may be implemented, for example, using software and/or firmware on the KVM device 802. By using the techniques described herein, a user on a source device 804 may remotely access and control, both in-band and out of band, a target device 806 visible only from the KVM (e.g., the source device does not have visibility to the target device).

Figure 9:
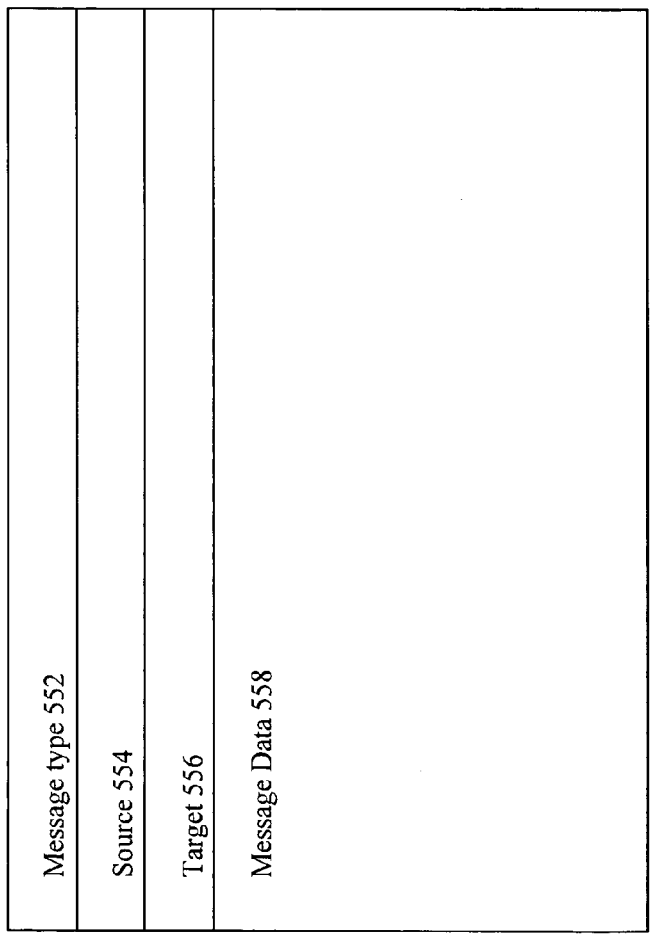
FIG. 9 is an example of an embodiment of a message format that may be used in connection with the techniques described herein.

Referring now to FIG. 9, shown is an example message format as may be used in connection with the techniques described herein. The example 550 message format may be used in connection with sending requests and responses in connection with the techniques described herein. The example 550 includes a message type 552, a source 554, a target 556, and message data 558. The message type 552 may indicate the particular type of message, such as particular type of request or response message as described elsewhere herein. The source 554 may indicate an address of the sender of the message. The target 556 may indicate an address of the recipient of the message. The message data 558 may include other input and/or output data that may be used in connection with the message type 552 and may vary with message type. An embodiment may include additional information in the format than as illustrated in the example 550. More detailed information about the particular message types that may be used in an embodiment is described elsewhere herein.

Following is a table of five types of requests that may be included and used in an embodiment. Additionally, the table summarizes the particular connections and the initiator and recipient of each message type. Other embodiments may use other message types than as described herein.

| Id | Request | Description | Connections Used | Initiator | Recipient |
|---|---|---|---|---|---|
| R1 | Initiate Tunnel | This request initiates the tunnel. It is sent upon a request being made by a person or software on a source device. | C1 | Tunnel Server | Tunnel Client |
| R2 | Send Received Data To Source Device | This request contains the data received from the target device. It is sent to the Tunnel Server for delivery to the source device. | C2, C4, C3 | Tunnel Client | Tunnel Server |
| R3 | Send Received Data To Target Device | This request contains the data received from the source device. It is sent to the Tunnel Client for delivery to the target device. | C3, C4, C2 | Tunnel Server | Tunnel Client |
| R4 | Terminate Tunnel | This request terminates the tunnel. It is sent upon a request being made by a person or software on a source device. | C1 | Tunnel Server | Tunnel Client |
| R5 | Terminate Tunnel Initiated From Target Device | Any termination of connection by target is sent back from the Tunnel Client to the Tunnel Server as part of subsequent R2 and R3 requests | C1, C2 | Tunnel Client | Tunnel Server |

Following are some data items that may be included in each type of request above. It should be noted that the data items included in the input fields represent those data items included in a first message sent from the initiator to the recipient. The data items included in the output fields indicate data items included in a second return or response message from the recipient to the initiator.

The following table outlines some of the data items that may be used in connection with the above-referenced request types R1-R5 indicated in the first column:

| Request | Input Fields | Output fields |
|---|---|---|
| R1 | Target device<br>Target service (e.g. target protocol plus end-point; TCP port/22) | Result of request (of establishing connection C2) |
| R2 | Data bytes | Result of request receipt |
| R3 | Data bytes | Result of request receipt |
| R4, R5 | Target device<br>Target service (e.g. target protocol plus end-point; TCP port/22) | Result of request (of terminating tunnel) |

In one embodiment, the messages may be sent in an XML format although other embodiments may use other formats than as described herein. Following are some example messages in XML format for the request and response messages of types R1-R4 as described above.

R1: Initiate Tunnel

Request

<ns1: RequestEnvelope xsi: schemaLocation="http://xsd.silverbacktech.com/SilverStreak" xmlns: ns1="http://xsd.silverbacktech.com/SilverStreak"
   xmlns: xsi="http://www.w3.org/2001/XMLSchema-instance">
   <ns1: RequestBatch LastRequestId="254">
    <ns1: RequestEnvelope ID="254">
     <ns1: RequestInitializeTCPProxy Port="3389" RemoteIP="10.100.1.152" Timeout="10000" priority="1"></ns1: RequestInitializeTCPProxy>
    </ns1: RequestEnvelope>
   </ns1: RequestBatch>
</ns1: RequestEnvelope>

Response

<ResponseEnvelope xmlns: xsd="http://www.w3.org/2001/XMLSchema" xmlns: xsi=http://www.w3.org/2001/XMLSchema-instance status="BatchResponse" xmlns="http://xsd.silverbacktech.com/SilverStreak">
   <ResponseBatch>
   <ResponseEnvelope requestId="166">
    <ResponseInitializeTCPProxy
      IsTunnelingAllowed="true" IsConnected="true"
      DuplicateProxy="false"
      ServerNotRunning="false"/>
   </ResponseEnvelope>
   </ResponseBatch>
</ResponseEnvelope>

R2: Send Received Data To Source Device

Request

<ns1: RequestEnvelope xsi: schemaLocation="http://xsd.silverbacktech.com/SilverStreak"
xmlns: ns1=http://xsd.silverbacktech.com/SilverStreak
xmlns: xsi="http://www.w3.org/2001/XMLSchema-instance">
   <ns1: RequestBatch LastRequestId="256">
    <ns1: RequestEnvelope ID="256">
     <ns1: RequestPushTCPProxyBytes RemoteIP="10.100.1.152" Bytes="AwAAKCPgAA AAAABDb29raWU6IG1zdHNoYXNoPUFkbWlua XN0cmENCg==" NumPushed="40" Port="3389" priority="1"></ns1: RequestPushTCPProxBytes>
    </ns1: RequestEnvelope>
   </ns1: RequestBatch>
</ns1: RequestEnvelope>

Response

<ResponseEnvelope xmlns: xsd="http://www.w3.org/2001/XMLSchema" xmlns: xsi=http://www.w3.org/2001/XMLSchema-instance status="BatchResponse" xmlns="http://xsd.silverbacktech.com/SilverStreak">
   <ResponseBatch>
   <ResponseEnvelope requestId="168">

```
<ResponsePushTCPProxyBytes        CountOfBytes-
    Pushed="40" ConnectionTerminated="false"/>
    </ResponseEnvelope>
  </ResponseBatch>
</ResponseEnvelope>
```

R3: Send Received Data To Target Device

Request

```
<ns1: RequestEnvelope xsi: schemaLocation="http://xsd.sil-
verbacktech.com/SilverStreak" xmlns: ns1=http://xsd.silver-
backtech.com/SilverStreak xmlns: xsi="http://www.w3.org/
2001/XMLSchema-instance">
  <ns1: RequestBatch LastRequestId="255">
  <ns1: RequestEnvelope ID="255">
    <ns1:              RequestGetTCPProxyBytes
      RemoteIP="10.100.1.152"   Port="3389"   prior-
      ity="1"></ns1: RequestGetTCPProxyBytes>
  </ns1: RequestEnvelope>
  </ns1: RequestBatch>
</ns1: RequestEnvelope>
```

Response

```
<ResponseEnvelope xmlns: xsd="http://www.w3.org/2001/
XMLSchema"       xmlns:      xsi=http://www.w3.org/2001/
XMLSchema-instance         status="BatchResponse"
xmlns="http://xsd.silverbacktech.com/SilverStreak">
  <ResponseBatch>
  <ResponseEnvelope requestId="171">
    <ResponseGetTCPProxyBytes
      Bytes="AwABTQLwgH9 mggFBCgEAAgEAMB-
      oCASICAQMCAQACAQECAQACAQECAwD/+
      AlBAgSCARsABQAUfAAB
      KhR2CgEBAAHAAE1jRG6BBAEMCAAEAAgA-
      AwwQAOsDAwDsA+0D7gMAAAIM7AAIAAAA-
      AgAAACAAAACA4AAAAogi6 b8bGNt5Fi/401u
      6hn1eJiO1L7OfhfKTrvXJwo4oBAAAAAQAAAA-
      qjEAAAAGAFwAUINBMUgAAAAAAgAAPw-
      AAAAEAAQAF RU92JI2ECrKlzjorY3 khCnUB-
      7U8WZ+qfNQ4sHXEAgCmh2/IOu1KuqDOd5/
      u6HIO5OJ0RIk0Oc/DrcS61n2jeAAAAAAAAA
      AAIAEgARValJWwTmD2OwSfDTq/GxrQvnTGa-
      6UZzTxtGXbCQ2h13XPwEibo6oZO5kzCutHIKy9
      hfGRIMAs1nKfOdWm       GHQAAAAAAAAAA"
      NumGotten="333"
      ConnectionTerminated="false"/>
  </ResponseEnvelope>
  </ResponseBatch>
</ResponseEnvelope>
```

R4: Terminate Tunnel

Request

```
<ns1: RequestEnvelope xsi: schemaLocation="http://xsd.sil-
verbacktech.com/SilverStreak" xmlns: ns1=http://xsd.silver-
backtech.com/SilverStreak xmlns: xsi="http://www.w3.org/
2001/XMLSchema-instance">
  <ns1: RequestBatch LastRequestId="383">
  <ns1: RequestEnvelope ID="383">
    <ns1:   RequestTerminateTCPProxy    Port="3389"
      Remote  IP="10.100.1.152"></ns1:  RequestTerm
      inateTCPProxy>
  </ns1: RequestEnvelope>
  </ns1: RequestBatch>
</ns1: RequestEnvelope>
```

Response

```
<ResponseEnvelope xmlns: xsd="http://www.w3.org/2001/
XMLSchema"       xmlns:      xsi=http://www.w3.orq/2001/
XMLSchema-instance         status="BatchResponse"
xmlns="http://xsd.silverbacktech.com/SilverStreak">
  <ResponseBatch>
  <ResponseEnvelope requestId="245">
    <ResponseTerminateTCPProxy/>
  </ResponseEnvelope>
  </ResponseBatch>
</ResponseEnvelope>
```

The foregoing describes a request/response protocol that may be used in facilitating communications between the source device of the Tunnel Server and one or more target devices through the Tunnel Client of the target network. The foregoing does not require that the target device be visible to the source network. The Tunnel Client in the foregoing may be characterized as a "slave" with respect to processing described herein for establishing secure communications. The administration and maintenance of the tunnel used for communications may reside with the Tunnel Server, Tunnel Client, or may be shared by both the Tunnel Server and Tunnel Client.

An embodiment may optionally include a Tunnel Server which also implements access control for the tunnels created. The access control may allow or deny tunnels to specific networks, devices, for specific protocols, and/or specific conditions. The Tunnel Client in an embodiment may also optionally implement a secondary access control for tunnels established to devices which are accessible to the Tunnel Client. In other words, this secondary access control may be used to further restrict access defined by the Tunnel Server but not increase privileges of the Tunnel Server. The Tunnel Client may further limit what devices in the remote or target network are accessible to a requestor. The Tunnel Server may define the privileges of specific users on the source network to access specific devices on the target network. The privileges can specify, for example, times and conditions on which users on the source network are able to have access to specific devices on the target network. The Tunnel Client can also define the privileges for the source network to access specific devices on the target network. The privileges can specify times and conditions on which the source network can access specific devices on the target network. The Tunnel Client may also include an on/off switch to allow all remote access to be turned off/on on-demand. Once this switch is turned off disabling remote access, an embodiment may provide no other way for direct access to the system on which the Tunnel Client resides. The access control, such as through analysis of the traffic, can also apply rules based on particular attributes, for example, as may be associated with a specific type of traffic flowing across a connection.

In the foregoing, the Tunnel Server and Tunnel Client may be implemented in software and/or hardware. In one embodiment, both components may be implemented using software used to produce executable code. As known in the art, the executable code may be executed by a processor, such as a CPU, to perform the processing steps described herein.

In an embodiment, the Tunnel Server may execute upon a third party web server. The web server may be configured with a digital certificate to ensure security of the communication between itself and clients using, for example, public key/private key encryption techniques known in the art. On the Tunnel Server, the C1 and C4 connections as described herein may be served using separate applications on the webserver for each connection. For example, a Java servlet may handle C1 processing and a second Java servlet may handle C4 processing. It should be noted that an embodiment may handling incoming and/or outgoing message processing using one or more servlets, applications, threads, and the like, for each connection in accordance with the traffic on each connection. For data transmitted, for example, over C1 and C4, any one or more compression techniques may be used. An embodiment may use a compression technique that provides a reasonable performance to compression rate such as, for example, Zip, to minimize bandwidth. As described herein in one embodiment, the Tunnel Server may be a perimeter device and may be a hardened, secure device including at a minimum a host-based firewall and the disabling of unnecessary services. The Tunnel Server may preferably include dual network interface cards to allow the intelligent filtering of LAN vs. WAN traffic. In connection with processing steps described herein when provisioning an end-point to establish a tunnel, the Tunnel Server may interact with the firewall to open the end-point for the LAN.

In an embodiment, the Tunnel Client may communicate using an HTTP library to the Tunnel Server using HTTPS, which provides 128-bit SSL encryption. The public key for the Tunnel Server may be used in connection with the Tunnel Client as part of the installation of the Tunnel Client in order to validate the certificate presented by the Tunnel Server for the purposes of establishing a secured HTTP connection. The Tunnel Client may be implemented as a service on the target system that automatically starts on startup. The Tunnel Client may include an equivalent compression library as may be used by the Tunnel Server as set forth above.

An embodiment may include a monitoring and reporting infrastructure for the tunnels as used herein. Such an infrastructure may monitor and report on information regarding, for example, the traffic, age, end points, and security of the tunnels.

An embodiment may include support for configuring a Tunnel Client with multiple Tunnel Servers to allow for redundancy and failover. In addition, the Tunnel Server and parameters associated with connections C1 and C4 can be configured in accordance with the particulars of specific network or bandwidth requirements (e.g. to utilize no more than 1 megabit per second) of the links over which the Tunnel Clients communicate.

An embodiment may use XML as the message format for transmission of communications between the Tunnel Client and Tunnel Server as may be defined and validated using XML Schema.

An embodiment may include a Tunnel Server and a Tunnel Client which support the tunneling of single-port TCP and UDP traffic (e.g., traffic that uses a single IP port for communication). The foregoing provides support for core remote access technologies of ssh, telnet, Terminal Services, and VNC.

An embodiment may include a Tunnel Client and Tunnel Server implemented using hardware and/or software. As described herein, the Tunnel Server may be embodied as a perimeter device including hardware and/or software used in connection with the techniques described herein. Alternatively, an embodiment may include the Tunnel Server on an interior device with respect to the source network and having only a single end-point made visible to Tunnel Clients. For example, a Tunnel Server can be deployed on an interior network, and a "hole" can be poked in a perimeter device such as a firewall (e.g., via firewall rule modifications) to allow incoming HTTPS traffic from the networks on which the Tunnel Clients may reside.

It should be noted that an embodiment may use the C1 and C4 connections to make the techniques herein scaleable in a system in which numerous Tunnel Clients may connect to a single Tunnel Server. The techniques described herein are illustrated using a single Tunnel Server and single Tunnel Client. However, other variations of this general illustration are possible in accordance with the particular application and use of the techniques herein.

As one example, the source network described herein may be a service provider network providing a service to one or more end user networks. Each of the end user networks may be a target network. In accordance with this first example is a service provider model. The service provider may offer, for example, security monitoring of systems, facilities, software, and the like, in each of the end user networks. The end user networks may include unique software installations for which the service provider may, for example, provide IT and/or security monitoring and management of targeted objects at the location of the tunnel client. An alert or other message may be generated in one or more of the end user/target networks. The alert may result in generation of a notification, such as by a pager, email, or the like, to personnel in the service provider/source network. At this point, a user in the service provider network may desire to establish communications with one or more of the end user networks for each of the alerts received. Using the techniques described herein, the user in the service provider network may communicate with each of the end user networks to issue commands, obtain status information, and the like. Using the techniques described herein, the service provider, the Tunnel Client and the Tunnel Server may be used to establish connections to remote locations at distinct end users. In the service provider model, each of the service provider networks and end user networks may be operated and maintained by different entities with the end users subscribing to a service. The alerts such as may be generated by one or more end user networks may be the result of proactive monitoring by a user in the service provider network, or may be generated via event reporting capabilities within each end user network. The initial alert or notification, as may be generated via event reporting in the end user network, to a user in the service provider network may use the tunnel as described herein and/or another communication means to notify the service provider.

The techniques described herein may also be used in connection with an embodiment in accordance with an end user model in which the source network and one or more target networks may be operated and owned by a same entity, such as a corporation. However, the different target networks may each be at remote locations which are monitored from a single source network, such as a network at a headquarters location. In this example, the Tunnel Client and Tunnel server may be used to establish connections to remote corporate locations/target locations.

Figure 10:
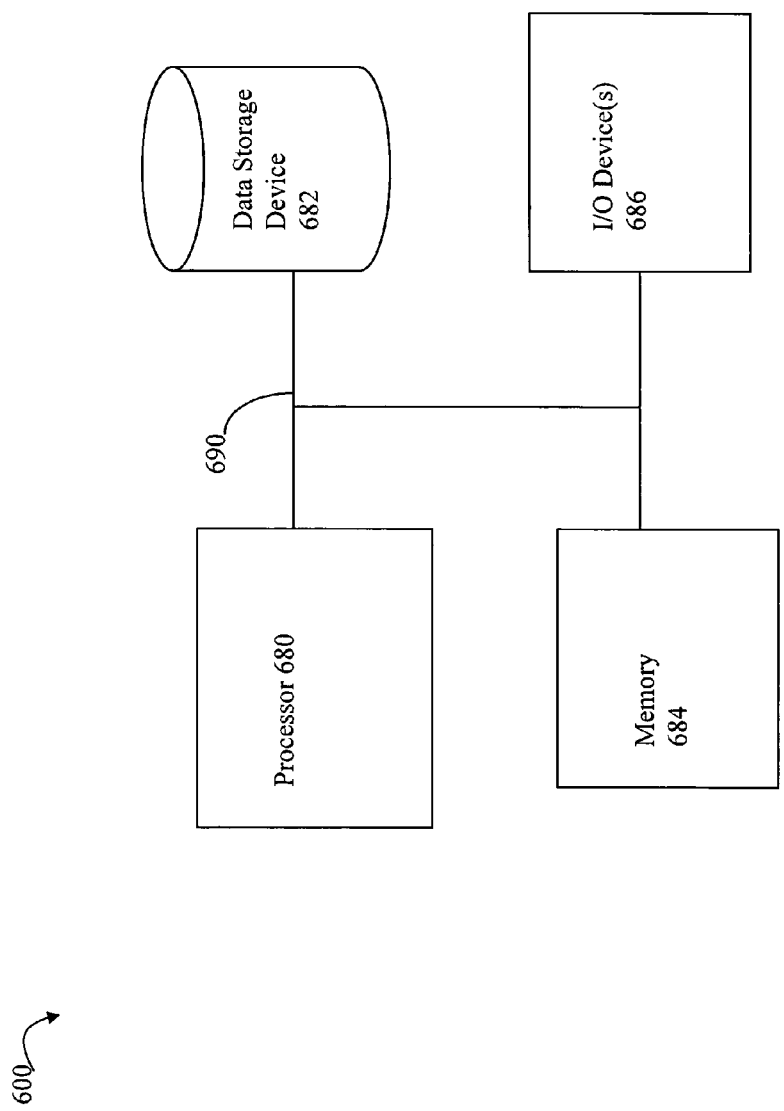
FIG. 10 is an example of an embodiment of components that may be included in a computer system used in connection with the techniques described herein.

Referring now to FIG. 10, shown is an example of an embodiment of a computer system which may be used in connection with the techniques described herein. The computer system of FIG. 10 may be used to execute code as may be included in an embodiment in implementing the techniques described herein. It should be noted that although a particular configuration of system 600 is described herein for purposes of illustration, it will be appreciated by those skilled in the art that a variety of different configurations may be used. Included in the example 600 is a processor 680, a memory 684, one or more I/O devices 686 and one or more data storage devices 682 that may be accessed locally within the particular host system. Each of the foregoing may communicate using a bus or other communication medium 690. Each of the foregoing components may be any one of more of a variety of different types in accordance with the particular computer system 600.

Computer instructions may be executed by the processor 680 to perform a variety of different operations. As known in the art, executable code may be produced, for example, using a loader, a linker, a language processor, and other tools that may vary in accordance with each embodiment. Computer instructions and data may also be stored on a data storage device 82, ROM, or other form of media or storage. The instructions may be loaded into memory 84 and executed by processor 80 to perform a particular task such as in connection with implemented the techniques described herein. An embodiment of a computer system as illustrated in FIG. 10 may be included, for example, as the source device 112, the tunnel client 124 and the target device 122. As described herein, the tunnel server 114 may be a perimeter device comprising a different configuration of a computer system than may be included, for example, as the source device. For example, the tunnel server 114 may include one or more processors, memory, communication connections, and data storage devices but may not include a terminal and keyboard as may be included in the source device.

The foregoing describes establishing a secure connection between a source device and a target device in which the source device may not be visible to the target device. Three connections are used to form the secure connection: a first connection between a tunnel client and a tunnel server, a second connection between the tunnel server and the source device, and a third connection between the tunnel client and the target device. The source device has visibility to the tunnel server, the tunnel client has visibility to the target device, and the tunnel client has visibility to the tunnel server. The secure connection may be established as a point-to-point tunnel between the source and target devices without requiring the use of specialized or customized hardware and/or software on either of the source or target devices. Communication may be performed between the devices using industry standard protocols. Use of the foregoing three connections and visibility characteristics provides a virtual point-to-point connection between the source and target devices. Use of the foregoing connections allows an embodiment to have a source device which may not be visible to the target device and which may use the techniques described herein.

It should be noted that a device as used in connection with the techniques described herein may be a machine or other component capable of running software or firmware, such as, for example, a computer, handheld device, phone, power supply, power source, router, switch, or a keyboard/video/mouse switch (KVM). It should also be noted that a connection as used with the techniques described herein may refer to a logical connection representing a link with two end points through which information flows over a physical connection. The logical connection may be implemented using any one or more protocols, either connection-oriented or connection-less, as known in the art.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for establishing a secure connection between a source device and a target device comprising:
providing a first connection between a tunnel client and a tunnel server, a second connection between said tunnel server and said source device, and a third connection between said tunnel client and said target device;
receiving a request over said second connection at said tunnel server from the source device to send data to the target device;
sending a first message from the tunnel client to the tunnel server over said first connection;
sending said request in a return message over said first connection to said tunnel client; and
sending said request to said target device from said tunnel client over said third connection, wherein said first connection is continually re-established at each of a plurality of occurrences of a predetermined time interval, said tunnel client sending a message to said tunnel server over said first connection at said each occurrence, said first message being one of a plurality of messages sent at one of said plurality of occurrences, wherein said tunnel server sends a response to said tunnel client for each of said plurality of messages upon an earlier occurrence of a predefined expiration time interval elapsing or said tunnel server receiving a message to transmit to said tunnel client over said first connection as part of said response.

2. The method of claim 1, wherein the source device has visibility to the tunnel server, the tunnel client has visibility to the target device, and the tunnel client has visibility to the tunnel server.

3. The method of claim 2, wherein the source device does not have visibility to the target device.

4. The method of claim 1, wherein the tunnel server is included in a perimeter device of a source network which communicates with said source device.

5. The method of claim 1, further comprising:
receiving, at said tunnel server over said second connection, a request from said source device to establish a tunnel; and
transmitting said request over a fourth connection between said tunnel server and said tunnel client.

6. The method of claim 1, wherein said first connection and a fourth connection are used to transmit messages between said tunnel server and said tunnel client, said first connection being used to transmit messages and responses to initiate and terminate a tunnel between said source device and said target device, said fourth connection being used to transmit other messages.

7. The method of claim 6, wherein said fourth connection is characterized as having a higher priority link than said first connection, and wherein said fourth connection is established by said tunnel client in an event-driven manner in response to data being added to an outgoing message queue, wherein said data is to be sent to said tunnel server by said tunnel client.

8. The method of claim 5, wherein said first connection and said fourth connection are each continually re-established in accordance with different establishment time intervals.

9. The method of claim 1, wherein said predefined expiration time interval indicates that, at said each occurrence of said predetermined time interval establishing said first connection, said first connection remains established no longer than said predefined expiration time interval.

10. The method of claim 5, wherein each of said first connection and said fourth connection have different message queues.

11. The method of claim 1, wherein said tunnel server services a plurality of tunnel clients.

12. The method of claim 1, wherein said tunnel client connects to a plurality of tunnel servers.

13. The method of claim 1, wherein said tunnel server is included on an interior device of a source network.

14. The method of claim 1, wherein at least one of said tunnel client and said tunnel server permit access from a source network including said source device to a target network including said target device in accordance with access control privileges.

15. The method of claim 14, wherein said access control privileges of said tunnel client indicate what devices in the target network are accessible to a particular user of said source network, and wherein said access control privileges of said tunnel server specify privileges of users of the source network to access devices in the target network.

16. The method of claim 1, wherein said source device is included in a source network and said target device is included in a target network, said source network being a service provider network to perform monitoring of one or more objects in said target network, at least one of said objects being at a location of said tunnel client.

17. The method of claim 16, wherein said service provider network establishes communications with said target network by sending said request over said second connection.

18. A method for communicating between a source device and a target device comprising:
   receiving, at a tunnel server, a request from a source device to initiate a tunnel to said target device;
   transmitting said request from said tunnel server to a tunnel client over a first connection, said request being included in a return message to said tunnel client in response to another request from said tunnel client previously received at said tunnel server; and
   wherein said tunnel server receives incoming messages from said tunnel client and said tunnel server transmits an outgoing request from said source device to said target device by including said outgoing request in a return message to said tunnel client in response to one of said incoming messages, and wherein said tunnel client communicates said outgoing request to said target device over a second connection, and said source device and said tunnel server communicate over a third connection, wherein said first connection is continually re-established at each of a plurality of occurrences of a predetermined time interval, said tunnel client sending one of said incoming messages to said tunnel server over said first connection at said each occurrence, wherein said tunnel server sends a response to said tunnel client for each of said incoming messages upon an earlier occurrence of a predefined expiration time interval elapsing or said tunnel server receiving a message to transmit to said tunnel client over said first connection as part of said response.

19. A computer-readable medium including code thereon for establishing a secure connection between a source device and a target device, the computer-readable medium comprising code that:
   provides a first connection between a tunnel client and a tunnel server, a second connection between said tunnel server and said source device, and a third connection between said tunnel client and said target device;
   receives a request over said second connection at said tunnel server from the source device to send data to the target device;
   sends a first message from the tunnel client to the tunnel server over said first connection;
   sends said request in a return message over said first connection to said tunnel client; and sends said request to said target device from said tunnel client over said third connection, wherein said first connection is continually re-established at each of a plurality of occurrences of a predetermined time interval, said tunnel client sending a message to said tunnel server over said first connection at said each occurrence, said first message being one of a plurality of messages sent at one of said plurality of occurrences, wherein said tunnel server sends a response to said tunnel client for each of said plurality of messages upon an earlier occurrence of a predefined expiration time interval elapsing or said tunnel server receiving a message to transmit to said tunnel client over said first connection as part of said response.

20. The computer readable medium of claim 19, wherein said tunnel server is located between a first firewall of a source network and a second firewall of a target network including said tunnel client.

* * * * *